(12) United States Patent
Terhune et al.

(10) Patent No.: US 12,258,980 B2
(45) Date of Patent: *Mar. 25, 2025

(54) SUBSEA HYDRAULIC PRESSURE BOOSTING AND REGULATING SYSTEM

(71) Applicant: The Oilgear Company, Traverse City, MI (US)

(72) Inventors: Mitch Terhune, Williamsburg, MI (US); Jared Schlueter, Traverse City, MI (US); Joshua B. Groves, Sisters, OR (US)

(73) Assignee: The Oilgear Company, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,605

(22) Filed: Aug. 1, 2022

(65) Prior Publication Data

US 2023/0058722 A1 Feb. 23, 2023

Related U.S. Application Data

(63) Continuation of application No. 17/140,936, filed on Jan. 4, 2021, now Pat. No. 11,401,954.

(60) Provisional application No. 62/957,038, filed on Jan. 3, 2020.

(51) Int. Cl.
| | | |
|---|---|---|
| *F15B 11/032* | (2006.01) | |
| *F15B 1/027* | (2006.01) | |
| *E21B 33/035* | (2006.01) | |

(52) U.S. Cl.
CPC ............ *F15B 11/032* (2013.01); *F15B 1/027* (2013.01); *E21B 33/035* (2013.01)

(58) Field of Classification Search
CPC ...... F15B 3/00; F15B 11/032; F15B 13/0433; F16K 17/048; E21B 33/035
See application file for complete search history.

(56) References Cited

U.S. PATENT DOCUMENTS

| | | | |
|---|---|---|---|
| 3,440,967 A | 4/1969 | Pennther | |
| 3,540,348 A * | 11/1970 | Pennther | ................... F15B 3/00 91/309 |
| 3,811,795 A * | 5/1974 | Olsen | ........................ F04B 9/10 417/397 |
| 3,848,632 A | 11/1974 | Powell | |
| 4,895,342 A | 1/1990 | Feild | |
| 9,926,947 B2 | 3/2018 | Villar | |
| 10,138,877 B2 | 11/2018 | Oklejas, Jr. | |
| 10,240,430 B2 | 3/2019 | McCormick | |
| 2014/0283512 A1 | 9/2014 | Buhl | |
| 2014/0366717 A1 * | 12/2014 | Tsukane | ................... F04F 13/00 92/62 |
| 2016/0090999 A1 * | 3/2016 | Jorgensen | ............... F15B 13/02 60/591 |
| 2017/0082211 A1 | 3/2017 | Groves et al. | |

FOREIGN PATENT DOCUMENTS

DE 102012208079 A1 11/2013

OTHER PUBLICATIONS

Supplementary Partial European Search Report App. No. EP21736236, Dec. 2023.

* cited by examiner

*Primary Examiner* — Thomas E Lazo
(74) *Attorney, Agent, or Firm* — GableGotwals; David G. Woodral (57) ABSTRACT

A hydraulic boosting and regulating system includes an intensifier circuit and a regulator and employs low leak, low crossover valves.

14 Claims, 7 Drawing Sheets

SUBSEA HYDRAULIC PRESSURE BOOSTING AND REGULATING SYSTEM

CROSS-REFERENCE TO RELATED CASES

This application is a continuation of U.S. patent application Ser. No. 17/140,936 entitled SUBSEA HYDRAULIC PRESSURE BOOSTING AND REGULATING SYSTEM filed on Jan. 4, 2021 which claims the benefit of U.S. provisional patent application Ser. No. 62/957,038, filed on Jan. 3, 2020, and incorporates such provisional application by reference into this disclosure as if fully set out at this point.

FIELD OF THE INVENTION

This disclosure relates to subsea operations in general and, more specifically, to pressure boosting and regulation of subsea systems and operations.

BACKGROUND OF THE INVENTION

Subsea hydraulic systems may utilize accumulators to receive and dispense volumes of hydraulic fluid to aid in maintaining proper volume and pressure for various hydraulic circuits. For an accumulator to be useful for delivering pressure and fluid to a circuit it must be charged at a fluid and pressure level that is higher than that normally needed by the circuit.

Pressures needed to charge an accumulator can exceed nominal operating pressure of certain lines and equipment. On the other hand, it can be difficult, if not impossible, to provide outside or remote power to a pump or other device needed to increase hydraulic pressure at or near an accumulator for charging.

What is needed is a system and method for addressing the above and related issues.

SUMMARY OF THE INVENTION

The invention of the present disclosure, in one aspect thereof, comprises a system including at least one hydraulic intensifier circuit accepting a supply pressure and returning a boosted pressure that is higher than the supply pressure, and at least one regulator that accepts the boosted pressure and returns a regulated lower, regulated pressure that is lower than the boosted pressure.

In some embodiments, the hydraulic intensifier circuit further comprises a reciprocating piston having a first side and an opposed second side, each of the first and second side having with a larger low-pressure region and a smaller high-pressure region. A low pressure applied to the first side low pressure region moves the piston to create a high pressure on the second side high pressure region, and the low pressure applied to the second side low pressure region moves the piston to create the high pressure on the first side high pressure region. The hydraulic intensifier circuit may also comprise a first three-way control valve selecting for supply pressure or vent to the first side low pressure region of the reciprocating piston, and a second three-way control valve selecting for supply pressure or vent to the second side low pressure region of the reciprocating piston.

In some cases, the first three-way control valve provides supply pressure to the first side low pressure region when not piloted and vent to the first side low pressure region when piloted, and the second three-way control valve provides supply pressure to the second side low pressure region when not piloted and vent to the second side low pressure region when piloted.

The second control valve may pilot the first control valve. The piston, when making a first movement toward the second side, may close a first two-way valve thereby blocking vent to a pilot port of the second control valve. When making a second further movement toward the second side it may open a second two-way valve thereby providing supply pressure to the pilot port of the second control valve. The piston, when making a first movement toward the first side may close a third two-way valve thereby blocking supply pressure from the pilot port of the first control valve. When making a second further movement toward the first side it may close a fourth two-way valve thereby providing vent to the pilot port of the second control valve.

In some systems, the first and third two-way valves are normally open. The second and fourth two-way valves may be normally closed. The second and fourth two-way valves may remain piloted by supply pressure once piloted by contact with the piston. An additional return bias may be provided to the second one-way valve by the first control valve when supply pressure is provided to the first side low pressure region, and additional return bias may be provided to the fourth one-way valve by the second control valve when supply pressure is provided to the second low side pressure region.

In some systems, at least the first three-way control valve (and maybe others) further comprises a casing defining a pilot port, a first operating port, a second operating port, and a third operating port. A lower spool is configured to displace against a first spring bias in response to pressure at the pilot port. An upper spool defines an upper spool port in fluid communication with the third operating port and a lower spool port in fluid communication with the second operating port, the upper spool slidingly receiving the lower spool and displacing against a second spring bias in response to pressure from the lower spool, and having a hollow interior allowing fluid communication between the upper spool port and lower spool port when not under pressure from the lower spool such that the third and second operating ports are in fluid communication. A seat insert is slidingly engaged with the lower spool on a lower region thereof, the lower region of the lower spool blocking fluid communication with the first operating port when seated against the seat insert. The lower spool is configured to engage against the upper spool upon a first displacement of the lower spool blocking the lower port of the upper spool and thereby blocking fluid communication between the third and the second operating ports. A second further displacement of the lower spool moves an inletted portion of the lower region into the seat insert allowing fluid communication between the second and first operating ports.

In some embodiments, the lower region of the lower spool further comprises a non-inletted portion that blocks fluid communication through the seat insert to the first operating port during at least a portion of the first displacement.

The regulator may further comprise a pilot stage having a pilot housing and an upper member in the housing biased toward a middle member in the housing. The middle member seats against the upper member and provides main pilot port pressure against the upper member and further seating against the pilot housing to selectively block supply pressure from a lower member. The lower member is fixed to the pilot housing and provides a spring biasing the middle member against the upper member. The upper member displaces the middle member to allow pressure into the lower member and pilot port when the bias of the upper member exceeds the spring bias combined with a pressure in the main pilot port. The middle member displaces the upper member to seat on the housing and stops supply pressure into the main pilot port when the spring bias and pressure in the main pilot port exceeds the bias of the upper member. Pressure from the main pilot port can separate the upper member from middle member and allow fluid to flow through the lower member, middle member, and upper member to vent via a passage in the pilot housing.

In some cases, the regulator further comprises a main stage piloted by the main pilot port pressure to displace a valve from an internal valve seat and allow flow from a supply port to a regulated port. The regulator may also include a spool interposing the valve and the pilot port to receive pressure from the pilot port and displace the valve from the valve seat against a spring. The spool may be hollow admitting regulated pressure internally and may further have an internal spring biased cup selectively venting the regulated port pressure when regulated port exceeds a predetermined limit.

The invention of the present disclosure, in another aspect thereof, comprises a hydraulic pressure intensifier circuit including a reciprocating piston having a first side and an opposed second side, each of the first and second side having with a larger low-pressure region and a smaller high-pressure region, and a valve arrangement configured to shift application of supply pressure from the first side low pressure region to the second side low pressure region and vice versa in response to actuation by movement of the piston. The supply pressure applied to the first side low pressure region moves the piston to create a high pressure on the second side high pressure region. The supply pressure applied to the second side low pressure region moves the piston to create the high pressure on the first side high pressure region.

In some embodiments the valve arrangement further comprises, a first three-way control valve selecting for supply pressure or vent to the first side low pressure region of the reciprocating piston, and a second three-way control valve selecting for supply pressure or vent to the second side low pressure region of the reciprocating piston. The first three-way control valve provides supply pressure to the first side low pressure region when not piloted and vent to the first side low pressure region when piloted, and the second three-way control valve provides supply pressure to the second side low pressure region when not piloted and vent to the second side low pressure region when piloted.

In some cases, the second control valve pilots the first control valve. It may also be the case that: the piston, when making a first movement toward the second side closes a first two-way valve thereby blocking vent to a pilot port of the second control valve; the piston, when making a second further movement toward the second side opens a second two-way valve thereby providing supply pressure to the pilot port of the second control valve; the piston, when making a first movement toward the first side closes a third two-way valve thereby blocking supply pressure from the pilot port of the first control valve; and/or the piston, when making a second further movement toward the first side closes a fourth two-way valve thereby providing vent to the pilot port of the second control valve.

The invention of the present disclosure, in another aspect thereof, comprises a hydraulic regulator circuit with a pilot stage including a pilot housing, and an upper member in the housing biased toward a middle member in the housing. The middle member may seat against the upper member and provide main pilot port pressure against the upper member and further seat against the pilot housing to selectively block supply pressure from a lower member. The lower member may be fixed to the pilot housing and provide a spring biasing the middle member against the upper member. The upper member displaces the middle member to allow pressure into the lower member and pilot port when the bias of the upper member exceeds the spring bias combined with a pressure in the main pilot port. The middle member displaces the upper member to seat on the housing and stops supply pressure into the main pilot port when the spring bias and pressure in the main pilot port exceeds the bias of the upper member. Pressure from the main pilot port can separate the upper member from middle member and allow fluid to flow through the lower member, middle member, and upper member to vent via a passage in the pilot housing. The circuit includes a main stage piloted by the main pilot port pressure to displace a valve from an internal valve seat and allow flow from a supply port to a regulated port, and a spool interposing the valve and the pilot port to receive pressure from the pilot port and displace the valve from the valve seat against a spring. The spool is hollow admitting regulated pressure internally and further has an internal spring biased cup selectively venting the regulated port pressure when regulated port exceeds a predetermined limit.

DETAILED DESCRIPTION OF THE PREFERRED EMBODIMENTS

Figure 1:
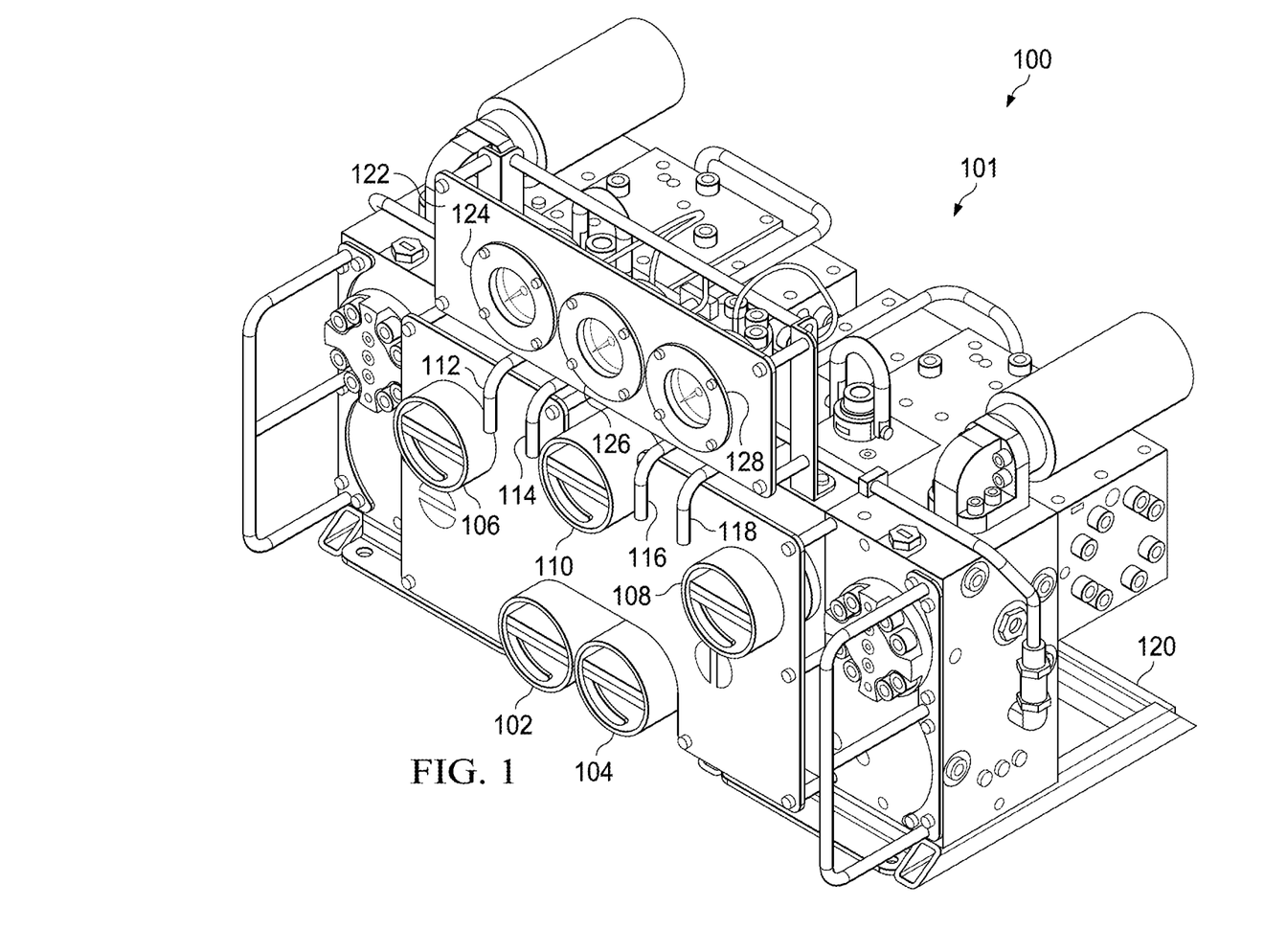
FIG. 1 is a perspective view of a subsea pressure boosting and regulating system according to aspects of the present disclosure.

With reference now to the FIG. 1, a perspective view of one embodiment of a physical packaging or configuration of a subsea pressure boosting and regulating system 100 is shown. According to various embodiments, the system 100 as a unit is fully hydraulic, meaning there are no electrical signals or connections needed. Once fluid is supplied to the inlet or consumed from the outlet, the system 100 will begin to operate until a system equilibrium is created. Also, according to various embodiments, the system 100 can be retrofitted to any blow out preventer (BOP) system without modifications. In various embodiments explained further below, the system 100 bolts on and connects to a hydraulically system with only three hoses (e.g., supply, accumulator, and regulated output). The system 100 does not require real-time control, and provides fully redundant intensifiers and regulators.

The physical appearance of the system 100 may vary, and FIG. 1 is only an example. The system 100 comprises a hydraulic circuit 101, the function of which is explained in greater detail below, but may take on a variety of external appearances. Control or operation of the system 100 may be by a plurality of externally operated ball valves. These provide external switches that are operated by remotely operated subsea vehicles. Accordingly, an actuator 102 is provided for operation of ball valve BV1; actuator 104 is provided for operation of ball valve BV2; actuator 106 is provided for operation of ball valve BV3; actuator 108 is provided for operation of ball valve BV4, and actuator 110 is provided for operation of ball valve BV5 (BV1, BV2, BV3, BV4, and BV5 shown in FIG. 2).

Vent outputs can also be seen in FIG. 1. These may include regulator valve A vent 112; intensifier A vent 114; intensifier B vent 116; and regulator valve B vent 118. A gauge panel 122 may also be provided and may provide gauges for regulator pressure 124; supply pressure 128; accumulator pressure 128 and others. Physically, the system 100 may be attached to a frame 120 including all necessary lift and support points to allow for subsea installation and operation but remote operated vehicle or otherwise.

In some embodiments, the subsea hydraulic boosting and regulator system (BARS) 100 of the present disclosure is close-coupled to associated subsea accumulators. The subsea BARS 100 boosts the pressure of flow that is incoming to the accumulators. When the accumulators must deliver flow to other subsea functions, the subsea BARS regulate the outgoing flow to a tolerable pressure level. In some embodiments, the subsea BARS has no electronics and functions automatically.

Figure 2:
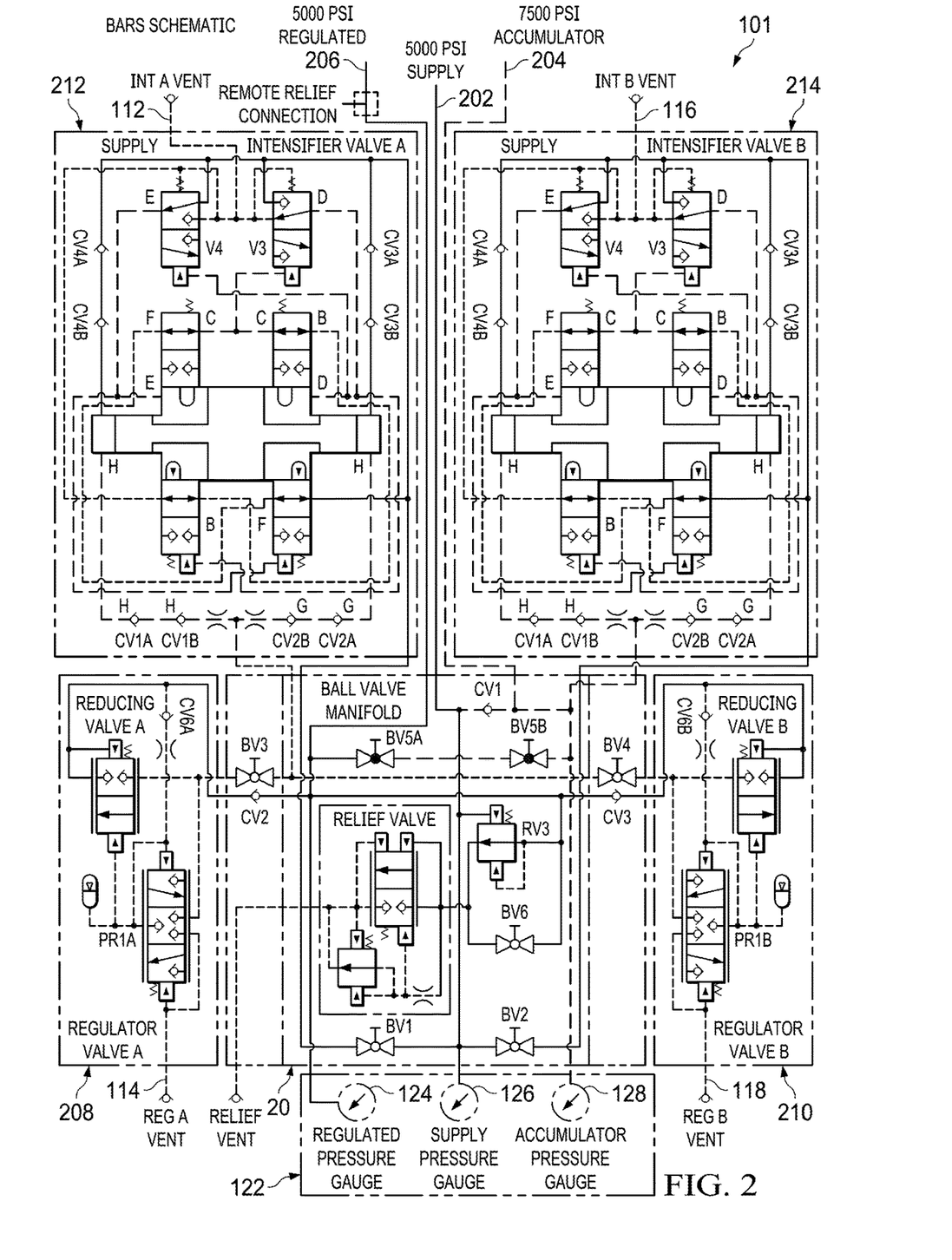
FIG. 2 is a hydraulic schematic diagram of a subsea pressure boosting and regulating system according to aspects of the present disclosure.

Referring now to FIG. 2 is a hydraulic schematic diagram of a subsea pressure boosting and regulating system according to aspects of the present disclosure is shown. The circuit 101 corresponds to a circuit implemented in the physical BARS packaging of FIG. 1. In various embodiments, an intended purpose of the illustrated BARS circuit 101 is to increase pressure in subsea accumulators, without the need to increase the pressure ratings of the existing appurtenant subsea piping and subsea hydraulic control systems.

Flow rates and pressures may be engineered or tailored to specific requirements of the system in which the BARS is deployed. Specific pressures, flow rates, and other parameters correspond to specific embodiments, but the present disclosure is not limited to the same. For example, in one embodiment, a BARS of the present disclosure faces an incoming supply 202 from the surface that has a maximum flow rate of 175 GPM and a max pressure of 5000 PSI. An outgoing un-boosted supply from BARS to subsea accumulators may also have a maximum flow rate of 175 GPM and a maximum pressure of 5000 PSI. Outgoing, boosted supply from BARS to subsea accumulators may have a maximum flow rate of 1.3 GPM with a maximum pressure of 7500 PSI. The connection to the accumulators is shown at connection 204 (whether boosted or in bypass mode). Incoming supply from the subsea accumulators (also at connection 204) to BARS may be up to a maximum of 175 GPM with a maximum pressure of 7500 PSI.

Regulated output from the BARS to subsea functions at connection 206 may have a maximum flow of 250 GPM or more and a regulated pressure setpoint at 5000 PSI or another selected pressure. This would presume that the associated subsea accumulators are rated to at least 7500 PSI. Parameters of the BARS may be set differently for systems having different capabilities. The BARS system itself may operate in high pressure (deep) environments having ambient pressures of from 0 to 5500 PSIG.

Regulating functions of the BARS hydraulic circuit 101 is completely redundant. One of at least two regulators, regulator valve A 208 and regulator valve B 210, is selectable by ball valves BV3, BV4, respectively. Boosting functions of the BARS hydraulic circuit 101 is also completely redundant. One of at least two intensifiers, intensifier valve A 212 and intensifier valve B 214, may be selectable by ball valves BV1, BV2, respectively. The boosting functions of the BARS hydraulic circuit 101 may also be able to be fully bypassed (e.g., via ball valve BV5).

Figure 3:
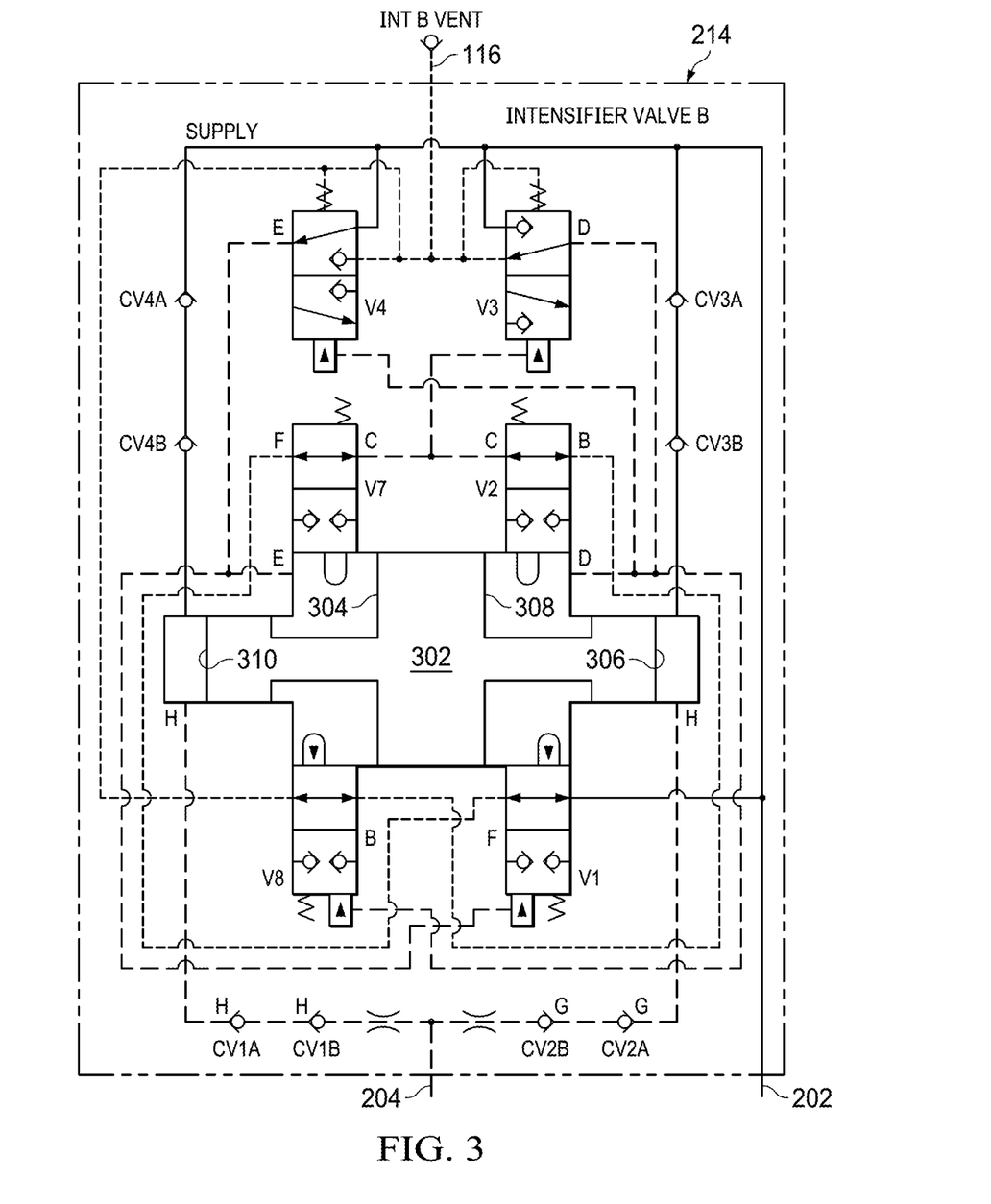
FIG. 3 is a hydraulic schematic diagram of an intensifier for use with a subsea pressure boosting and regulating system according to aspects of the present disclosure according to aspects of the present disclosure.

Referring now FIG. 3, a hydraulic schematic diagram of an intensifier 204 for use with a subsea pressure boosting and regulating system according to aspects of the present disclosure is shown. Although intensifier 214 is illustrated and discussed in detail, it should be understood that additional intensifiers included in the system 100 may operate in an identical way (e.g., intensifier 212). The intensifier 214 may be unpowered (apart from the input hydraulic pressure). It may be considered to be a double-acting intensifier. Two strokes may provide power via a reciprocating piston arrangement.

Diagrammatically, a piston 302 may be considered as viewed in cutaway within the circuit 101. Low pressures may be applied to a large surface area to provide high pressure on an associated smaller surface area. A two-sided annulus may provide a larger surface to be pressured by lower pressures and a double ended output ram may be used to create the associated higher pressures. Accordingly, piston 302 provides large surface areas 304, 308 to which relatively lower pressures may be applied (e.g., such as 5000 PSI supply) that result in relatively higher pressures (e.g., 7500 PSI accumulator pressure) at respective smaller surface areas 306, 310. The area difference between area 304 and 306, or 308 and 310, may be referred to as the intensification ratio of the intensifier 214.

A portion, or portions, of the piston 302 may actuate various valves at various positions within its reciprocating stroke to effect continual operation (e.g., periodic reversal) of the piston 302 boosting operations are needed based on pressures of the system (e.g., accumulator pressure of less than 7500 PSI and adequate supply pressure is present).

In order for an intensifier to be fully operational, the piston 302 must be able to start operation from any stopped position. Thus, a starting point of a piston cycle may be defined with the piston 302 somewhere in a middle position of the stroke, with pressure (e.g., supply pressure) being applied for the first time. The instant pressure and flow are available at the inlet (e.g., supply 202), the intensifier 214 automatically begins to cycle. The opposite is true when flow is stopped by shutting off the supply 202 to the intensifier 214. This causes the intensifier 214 to stop cycling and check valves (CV1A, CV1B, CV2A, CV2B) on the outlet will prevent high pressure from back feeding into the supply or vent circuits.

As noted, the stroke of the intensifier piston 302 is in two directions. While the E side 304 of the piston 302 is pressurized, control valves V3, V4 are in a spring offset position. This forces the intensifier 214 to always start with E region pressurized (area 304 of piston 302) and move towards valves V1 and V2 when started. Initially, supply pressure begins to fill the circuit via CV3A, CV3B, CV4A, and CV4B, which allow ends 306, 310 of piston 302 to be filled. Being that V4 is spring offset, E region is also filled through and D is vented through vent 116.

The filling of H and E creates a bias force towards V1 and V2 of the piston 302. Fluid can enter the low-pressure end of the piston through CV4A and CV4B. As the piston 302 moves, fluid is vented through V3 and CV2A and CV2B which keeps the piston from being hydraulically locked. Resistance to flow on the outlet allows pressure to build on the end of the piston 302 in region H (surface 306).

Once the piston 302 contacts valve V2 it is shut. This blocks the path for B to vent through V2. As the piston 302 moves past V2, it then activates V1. Once open, V1 connects supply 202 to F, through V7 into C and builds pilot pressure on V3. Once pressure has raised high enough to pilot V3, V3 connects supply 202 to D and begins to build pressure in the pilot of V4 and the annulus area 308 of the piston 302. D pressure also holds V1 in the piloted position. When V4 pilot builds high enough to shift, E is then connected to vent 116. This drops the pressure in the annulus area 304 of the piston 302 creates a bias force in the opposite direction (toward area 310). Fluid is allowed to fill the low-pressure end of the piston 302 through CV3A and CV3B. Fluid exits the high-pressure end of the piston through CV1A and CV1B.

When the piston 302 has moved far enough to contact and shift V7 it shuts the valve and stops F from filling C. As the piston 302 travels further, it contacts and shifts V8 which vents C. When C pressure falls, it allows V3 to spring return and vent D. When D vents, it allows V4 to spring return. Once spring returned, E is connected to supply, filling the E annulus area (at area 304). V3 connects D to vent which drops the pressure on the D annulus area (area 308). This creates a bias force driving the piston 302 towards V1 and V2. As the piston 302 moves this direction, it will no longer activate V8 but E pressure will hold that valve in the shifted position during the stroke. V7 is allowed to fully spring return as the piston 302 moves past it. As the piston 302 moves, fluid from D is displaced to vent 116, and intensified pressure can be created in region H on the end 310 of the piston 302. Fluid escapes this region and exits the intensifier 214 through CV2A and CV2B to accumulator line 204.

Note that an additional bias may be applied to V8 when V3 has shifted to provide supply pressure to D. Thus, V8 is not inadvertently piloted before contact with piston 302. Similarly, an additional bias maybe applied to V1 when V4 provides supply pressure to E to prevent piloting of V1 prior to contact by piston 302.

Figure 4:
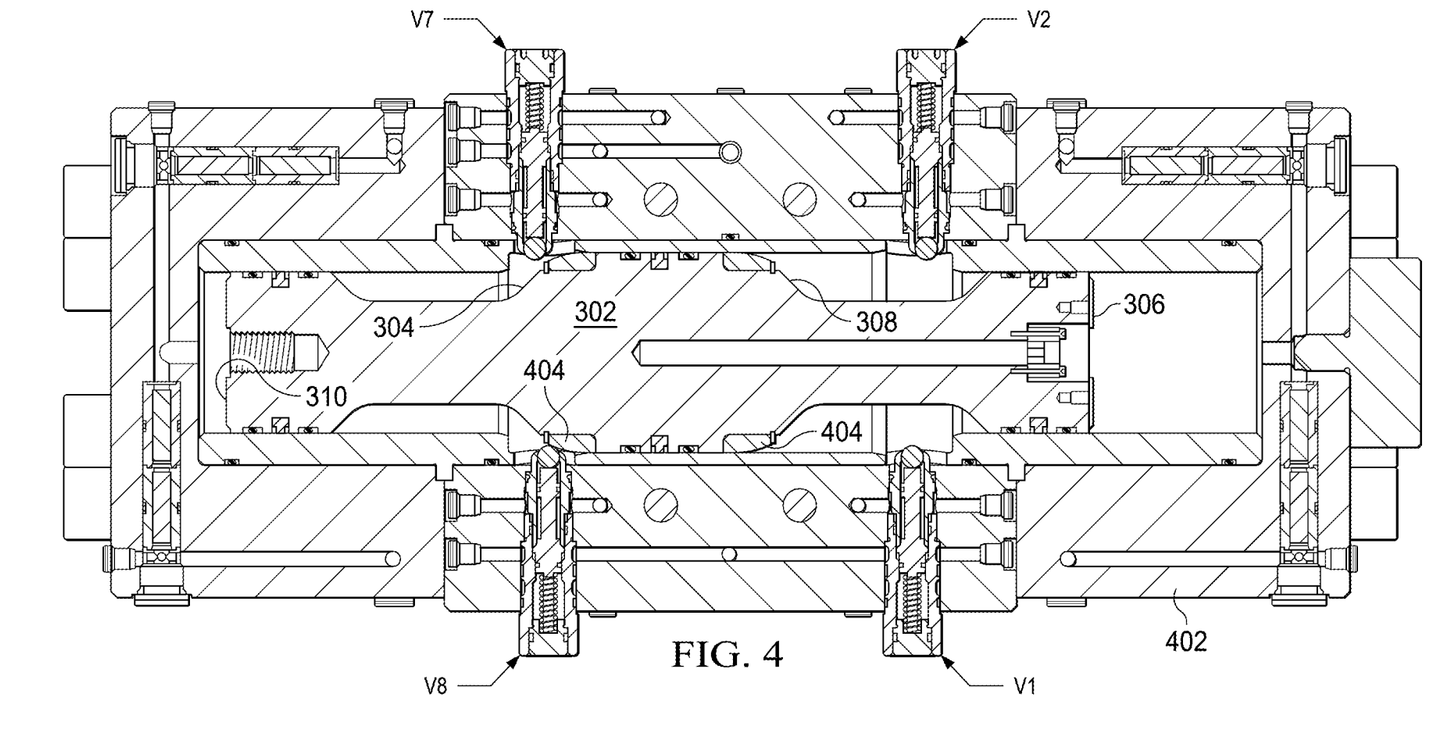
FIG. 4 is a side cutaway view of an intensifier piston for use with the circuit of FIG. 3.

Referring now to FIG. 4 is a side cutaway view of the intensifier piston 302 for use with the circuit of FIG. 3 is shown. The piston 302 provides one example of a piston that works within the circuit of intensifier 214 but other physical arrangements may be workable as well. FIG. 4 further illustrates the piston 302 operating within a void inside a casing or manifold 402 that may contain other operations components and portions of the intensifier such as valves V2, V2, V7, and V8. Stroke of the piston 302 (left and right, as illustrated) actuates V2, V2, V7, and V8 by displacement of internal stems and poppets as the piston 302 moves as described above. Pressure of supply fluid on area 304 and 308 inside the casing 402 acts to create the higher pressures on areas 306, 310 within casing 402 as described above. Wear resistant rings 404 may be provided on the piston 302 where it contacts or actuates valves.

Figure 5:
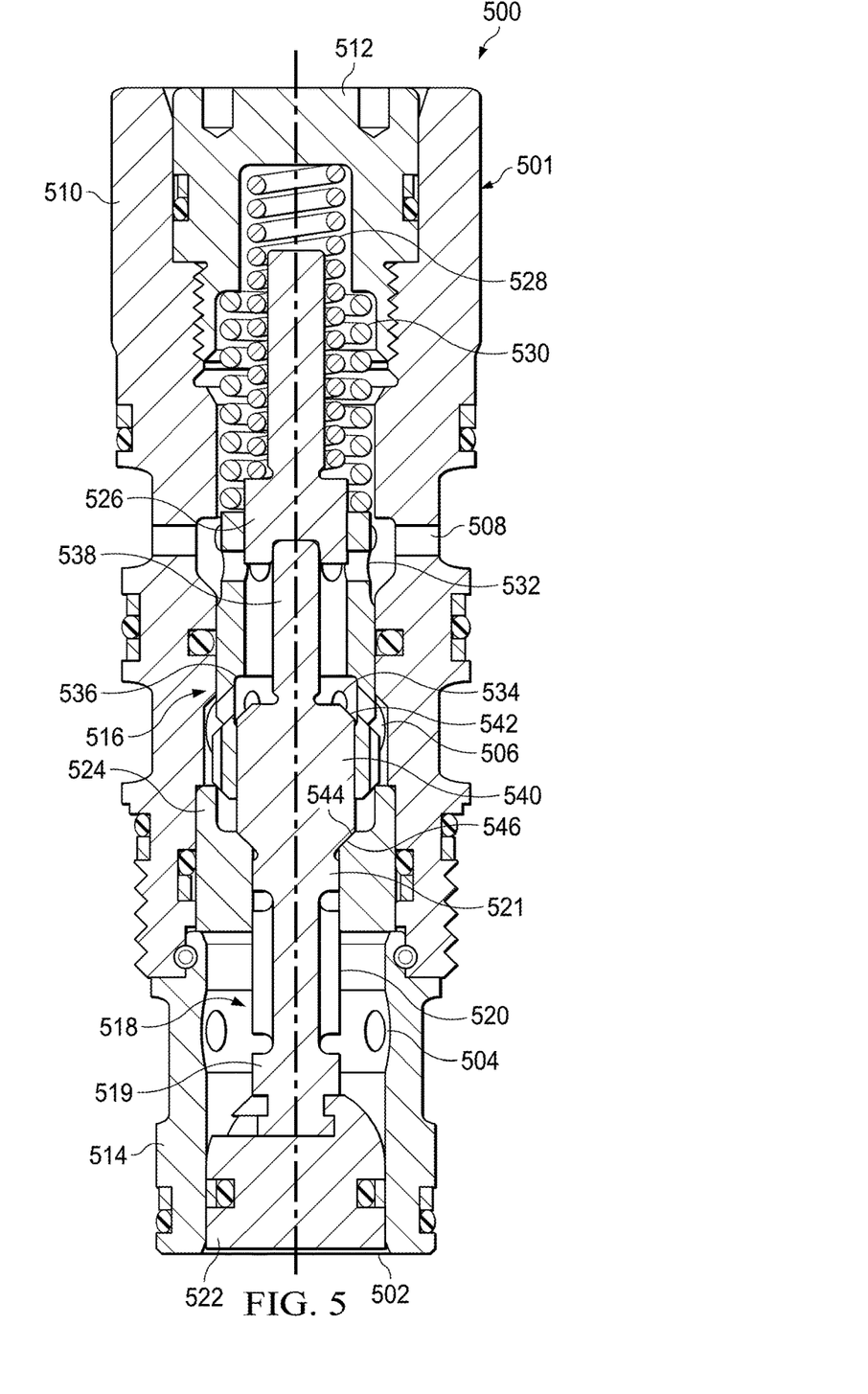
FIG. 5 is a side cutaway view of a normally open three-way valve for use with an intensifier according to the present disclosure.

In order for intensifiers such as intensifier 214 and others within the system 100 to operate property, certain two position, three-way valves must have low leakage rates and near zero cross over (i.e., a point during switching when supply, function, and vent ports are all connected). According to various embodiments, valves V1, V2, V7, and V8 are of this type, as explained herein. Referring now to FIG. 5, a side cutaway view of a normally open three-way valve 500 for use with an intensifier according to the present disclosure is shown. Such valve is suitable for use as valve V3 or V4.

The valve 500 comprises a body 501 providing a pilot port 502, a vent port 504, a function port 506, and a supply port 508. The body 501 can comprise multiple pieces such as sleeve 510, sleeve plug 512 and a spool stop 514. Internally, the valve 500 comprises an upper spool 516 and a lower spool 518. The upper spool 516 may be a hollow component having an upper port 532 and a lower port 534. Within the hollow upper spool 516, between the upper port 532 and lower port 534, a seat 536 may be defined that faces downward or toward the lower spool 518.

The lower spool 518 may comprise an upper stem 538 and a lower stem 519. Lower stem 519 may have a fluted or inletted lower portion 520 and an upper non-inletted portion 521 sized to fit tightly in the seat insert 524. A medial portion 540 of the lower spool 518 may interpose the upper stem 538 and lower stem 519. The medial portion 540 may define an upper shoulder 542 selectively acting as a sealing surface on seat 536 or upper spool 516. A lower shoulder 544 may selectively act as a sealing surface on an upward facing seat outer seat 546 on a seat insert 524 held rigidly in a predetermined position with respect to the body 501. The upper stem 538 is sized to fit within the upper spool 516 but allow fluid flow, while the medial portion 540 and lower stem 519 may be sized to selectively block fluid flow at the seat 536 or the seat insert 524.

A pilot spool 522 may be provided at the pilot port 502 rigidly affixed to the lower stem 519 of the lower spool 518. The pilot spool 502 actuates the valve 500 via transmitting forces to the lower spool 518. The lower spool 518 is spring-biased downward (toward the pilot spool 522) by a spring follower 526 acted upon by an inner spring 528 in contact with the sleeve plug 512. The upper spool 516 is also biased downward by an outer spring 530 in contact with the sleeve plug 512.

In the illustrated closed position, the upper spool 516 may be held in correct position by the outer spring 530 and by contact with the seat insert 524 proximate the medial portion 540 of lower spool 518. Lower spool 518 is held in position by inner spring 528 and contact between the lower shoulder 544 and the seat insert 524 at seat 546. In this position, being normally open, the valve 500 provides for fluid connection between supply port 508 and function port 506. The fluid pathway is in through supply port 508 and from there through the upper port 532 of upper spool 516 and inside the spool 516. From there the path is out the lower port 534 of the upper spool 516 and out the function port 506. Fluid is prevented from leaking to the vent port 504 by the medial portion 540 of the lower spool 518 in contact with the upper spool 516, the contact between the upper spool 516 and the seat insert 524, and the contact between the lower shoulder 514 and the seat 546.

In operation, with pressure applied to the pilot spool 522 the lower spool 518 move against the inner spring 528 and small distance. Though the lower spool 518 becomes unseated, fluid flow to the vent port 504 remains minimal owing to a tight tolerance where the lower stem 519 passes through the seat insert 524 at a the non-inletted portion 521.

The upper shoulder 542 of the lower spool 518 is further pushed into contact with the seat 536 in the upper spool 516 which blocks the connection between ports supply port 508 and function port 506 by closing upper spool 516 internally. At this point, all ports of the valve 500 are considered blocked. As lower spool 518 and upper spool 516 now continue to move upward (against springs 528, 530) a flow path is opened between ports function port 506 and vent port 504 when the fluted or inletted portion 520 of lower stem 519 moves through the seat insert 524. The valve 500 is fully piloted when either spring 528 or 530 is fully compressed or the spring follower 512 comes into contact with the sleeve plug 512. When spring returning, the same sequence of events happens, but in reverse of the piloted direction.

Figure 6:
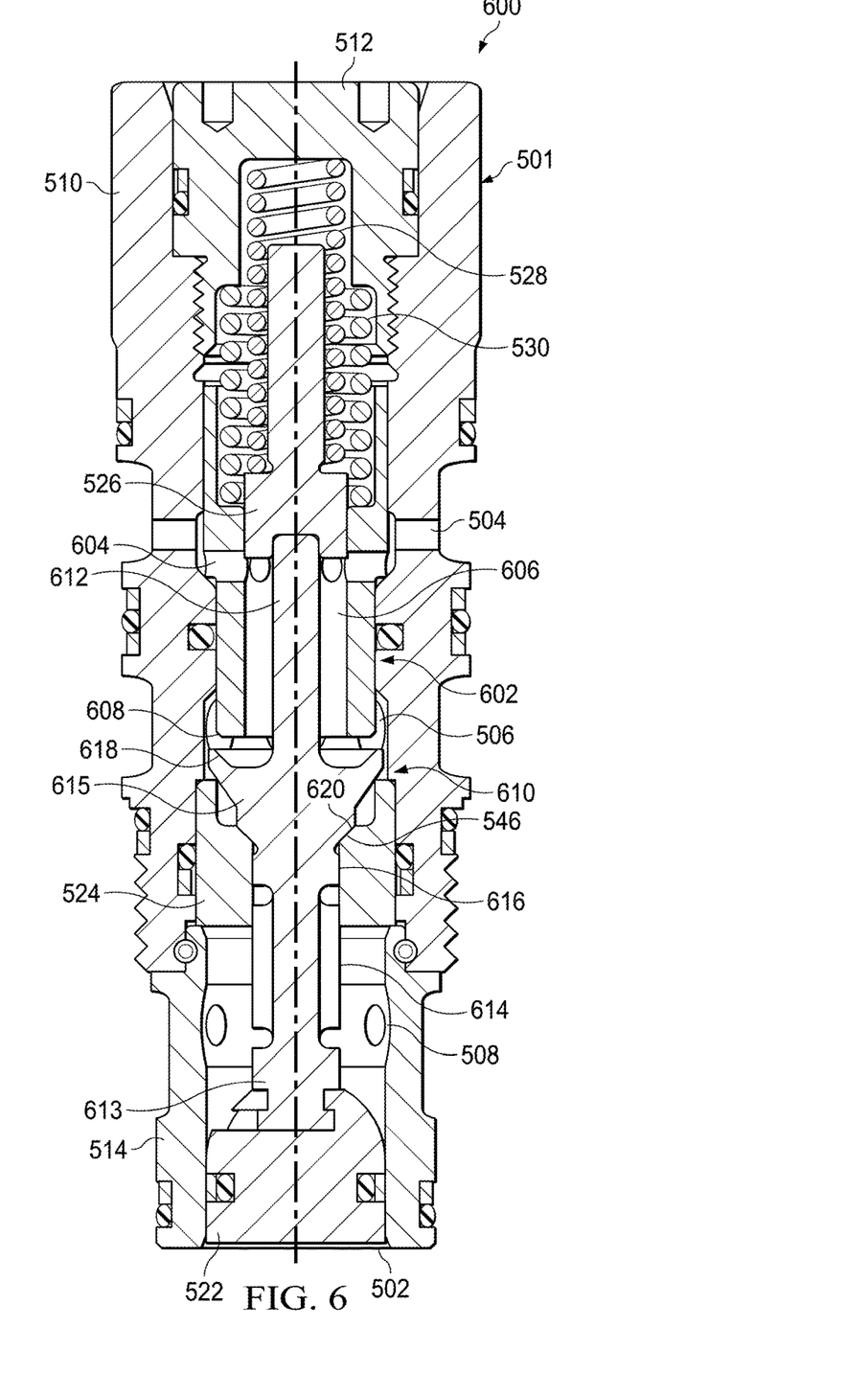
FIG. 6 is a side cutaway view of a normally closed three-way valve for use with an intensifier according to the present disclosure.

A valve may be changed from normally open to normally closed by, for example, changing the ports used as vent and supply. However, in order to achieve the low leakage and crossover needed for certain application, additional modifications may be needed. Referring now to FIG. 6 a side cutaway view of a normally closed three-way valve 600 for use with an intensifier according to the present disclosure is shown. The valve 600 is suitable for use as the valves V3 or V4. The valve 600 shares many components with the valve 500 discussed above. In addition to the location of the vent port 504 and the supply port 508 being exchanged, an upper spool 602 and lower spool 610 are configured somewhat differently as well.

Here the upper spool 602 comprises a hollow or tubular member having an upper port 604 allowing fluid flow between outside and inside the upper spool 604. An open bottom end of the upper spool 602 defines a lower port 606. A seal or seating surface 608 may be configured to selectively seal against a portion of the lower spool 610.

The lower spool 610 comprises an upper stem 612 that extends into the upper spool 602 and contacts the spring follow 526 engaging the inner spring 528. The upper stem 612 is sized to allow fluid communication through the upper spool 602. A medial portion 615 of the lower spool 610 defines a cupped seat 618 that selectively engages against the seal 608 of the upper spool 602 to block fluid flow through the upper spool. The cupped seat 618 may be concave to accept and circumscribe the lower port 606 of the upper spool 602. When moved away from the upper spool 602 (spring return position) the cupped seat 618 seals against the seat insert 524 blocking fluid from the supply port 508. A lower shoulder 620 of the seat 618 may be shaped to seal against seat 546 of seat insert 524 to this effect.

In the return position, as illustrated, vent port 504 is in fluid communication with upper port 604 of the upper spool 602 and thus to the interior of the upper spool 602. The cupped seat 618 is backed off from the lower port 606 which thereby communicates to function port 506. When piloted the cupped seat 618 moves to engage against lower port 606 of upper spool 602. This blocks the path between vent port 504 and function port 506. Fluid flow between function port 506 and supply port 508 initially remains blocked by a tight fit between a non-inletted upper portion 616 of a lower stem 613 of the lower spool 610 remaining within the seat insert 524. However, as a lower inletted or fluted portion 614 of the lower stem 613 moves into the seat insert 524 a fluid pathway is opened between function port 506 and supply port 508.

Again, the upper spool 602 is biased by outer spring 530 and the lower spool 610 is separately biased by inner spring 528. When either of these springs 528, 530 are fully compressed or the spring follower 526 contacts the sleeve plug 512 the valve 600 is fully piloted. When moving to a spring return position, the sequence of events is reversed with the upper spool 602 and lower spool 610 initially moving together such that vent port 504 remains blocked until function port 508 has been blocked by lower spool 610, at which point the lower spool 612 extends further separating the cupped seat 618 from lower port 606 of the upper spool 602 and restoring the fluid path between vent port 504 and function port 506.

Figure 7:
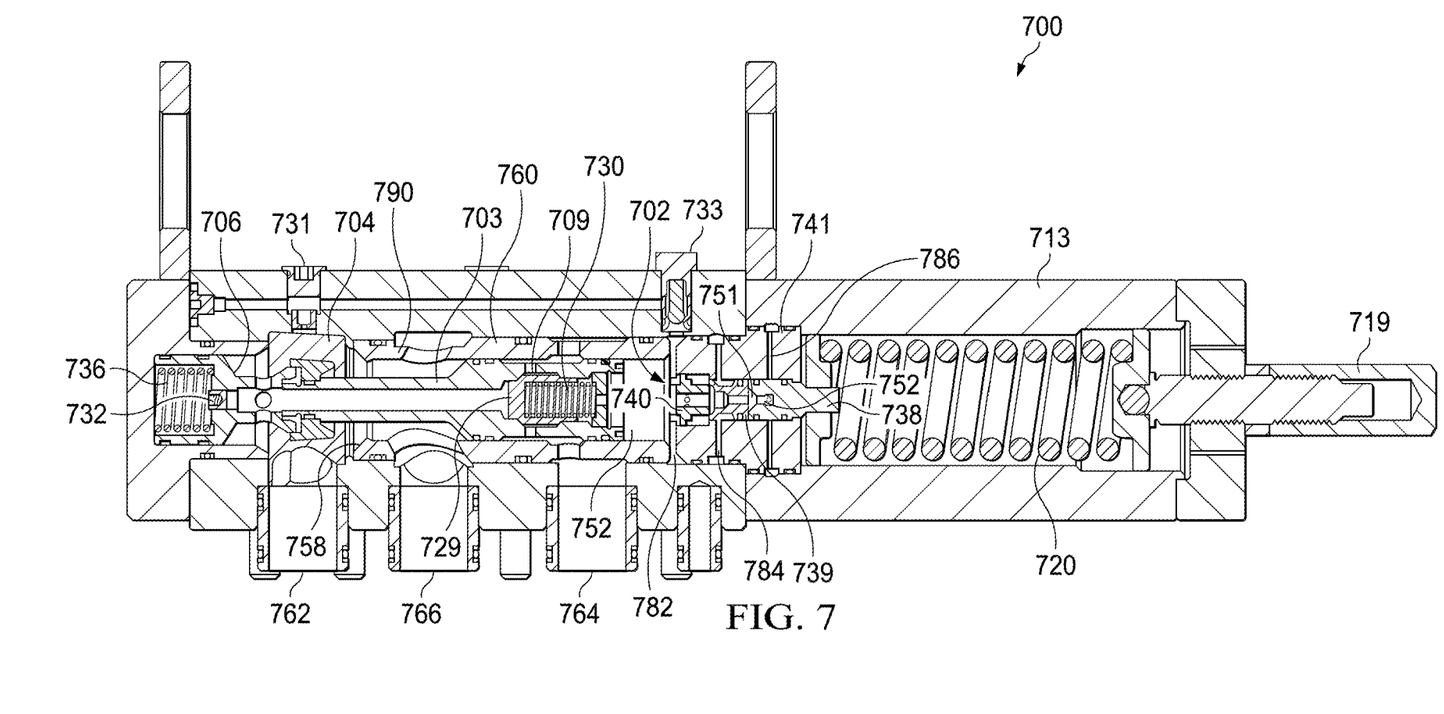
FIG. 7 is a side cutaway view of a regulator according to aspects of the present disclosure.

As discussed above, an additional function of the BARS system 100 is to provide regulated pressure as an output. The regulators 208, 210 may comprise regulation systems as are known in the art and which may be suitable or may be made suitable for the environment and operational parameters of the system 100. However, regulators 208, 210 may also comprise a regulator constructed in accordance with various embodiments of the present disclosure. Referring now to FIG. 7 a side cutaway view of a regulator 700 according to aspects of the present disclosure is shown. The regulator 700 is suitable for use within or as the regulator 208, 210 of the present disclosure.

A manual version of regulator 700 functions by having a spring 720 which creates a bias force for a pilot regulator 702. The spring force and ultimately the regulator set pressure can be manually changed by using screw mechanism 719 to compress or decompress the spring 720. In some embodiments, a housing 713 that contains the spring 720 is altered to allow a hydraulic connection to apply pressure rather than using a spring 720 to create the bias force on the pilot regulator 702. However, the basic regulator (720) design remains the same between these two implementations.

The pilot regulator 702 is housed in pilot housing 741. The spring 720 (or other pressure bias force) is transferred to top pilot member 738 which pushes on middle pilot member 739. Middle pilot member 739 defines an interior opening communicating to an interior opening on a lower pilot member 740. The middle pilot member 739 has a nose 751 opposite the lower pilot member 740 that selectively engages with a top pilot member 738. Top pilot member 738 defines an interior passage opening to middle pilot member 739 that is also closed on an opposite end. However, a radial passageway 786 leads from within the top pilot member 738 to the outside of the top pilot member 738. The housing 741 also provides a radial passage 782 at the bottom (left), below the bottom pilot member 740, a radial passageway 784 on a medial portion leading to outside the middle pilot member 739, and an upper radial passageway 786 leading to outside the upper pilot member 738. In some embodiments, passageway 784 provides supply pressure and passageway 786 provides vent.

The nose 751 of middle pilot member 739, when seated against top pilot member 738, blocks the interior passageway of the top pilot member 738. However, the nose 751 defines one or more lateral passageways that allows for fluid communication from within the middle pilot member 739 to inside top pilot member 738 when the two are separated.

Middle pilot member 739 has a seat on pilot housing 741 which makes a seal and prevents middle pilot member 739 from pushing upward (right in the drawing) on top pilot member 738. An outer surface of top pilot member 738 is exposed to supply pressure.

When the system 700 is at low pressure, there will be minimal pressure inside of middle pilot member 739. Without pressure internal to middle pilot member 739, the spring force pushing on top pilot member 738 will unseat middle pilot member 739 from the pilot housing 741 (moving it leftward as shown) and allow pressure to fill pilot region 752 of a main stage regulator 760. It will also fill the regulated port 762 through the check valve assembly 733 and orifice 731 until both the regulated and pilot pressure rise.

It is important to note that due to the large force on upper pilot member 738 from the spring 720 (or hydraulic pressure), upper pilot member 738 and middle pilot member 739 make a seal and move together. Once the pressure in the pilot region 752 starts to build, it begins to create a resulting force on middle pilot member 738. This in turn pushes on the spring 720 (or the hydraulic pressure), and begins to balance out the bias force. Once the pressure in pilot region 752 is high enough to nearly match the bias force, a spring 712 will provides enough force to push middle pilot member 739 into contact against the seat of pilot housing 741 and create a seal. This blocks supply pressure from raising the pressure in the pilot region 752. Should the pilot pressure be high enough to create more force on middle pilot member 738 than the bias force can offset, it will separate middle pilot member 738 and upper pilot member 739 and allow pressure in the pilot region to escape out the passageways of 741 and out vent port 764 of the regulator 700.

The pressure on the pilot region 752 is thus maintained by the pilot regulator 702 as described above. The main stage 760 of the regulator 700 is designed to use this pilot pressure as a reference pressure which creates the "set point" at which the regulator tries to maintain during operation. This is accomplished by having the pilot pressure push on spool 703 slidable within sleeve 790. Being that valve 704 is affixed attached to spool 703, pilot pressure may overcome the force created by spring 736 and spring follower 706, as well as a pressure in the regulated port 762 that is too low to offset the force created by the pilot. This causes valve 704 to push away from valve seat 758 on sleeve 790, breaking the seal made by the contact between these two parts. This allows fluid from the supply port 766 to move from the outside to the inside of sleeve 758, past valve 704, and out through the regulated port 760.

The shape and design of valve 704 is tapered in such a way such that it creates a very dampened flow path with low gain, meaning the flow path is opened gradually. This is especially effective when small flows are required. The geometry also utilizes the flow forces to help "push" valve 4 as open as soon possible to create an efficient flow path when a large pressure differentials exists. To this end, the top, or high-pressure side, of valve 704 may be dished where it joins spool 703.

On the other hand, orifice 731 housed in spring follower 706 creates a restriction for the displaced fluid in the spring chamber of spring follower 706 when valve 704 is forced open quickly by a large pressure differential. This design forces the regulator 700 to open slowly, helping to reduce downstream pressure spikes that can cause damage to the system or regulator oscillation.

Due to the fact that spring follower 706 is not affixed to spool 703 or valve 704, the regulator can "snap" closed and quickly stop the supply pressure from raising the regulated pressure beyond the set point. In the event that the regulated pressure increases above the set point, a relief valve will open and vent off excess pressure. A separate relief valve (not shown) may be used or a relief valve 729 may be provided in the spool 703 as described below.

It is common for downstream equipment to create pressure spikes in the regulated port 762 as well as any unintended leakage across the regulator main stage 760. To protect against over pressurization, the regulated pressure works on the nose area of cup 709 (part or relief valve 729) creating an opening force. This opening force is balanced by a spring 730 as well as the pilot pressure. When the pressure in the regulated port 762 exceeds the pilot pressure by the spring and area ratio of the relief, it will force cup 709 open and compress the spring 730 until either cup 709 bottoms out (right most position, as shown), or the pressure in the regulated port 762 is lowered. When cup 709 is forced open by the regulated pressure, this region becomes connected to the vent port 709 via ports in spool 703. When the regulated pressure is relieved to a low enough pressure where it can no longer overcome the pilot pressure and the spring 730, the bias force will push cup 709 back into a seating edge of spool 703 and block the flow path from regulated port 762 to vent port 764.

In various embodiments, a meantime between failures (MTBF) of a BARS system, 100 must be in the range of 24 months of operational subsea usage. Given such an MTBF requirement, the corresponding cycle requirements are estimated as Intensification circuit: 350,000 reciprocating cycles on the intensifier circuit and 12,000 flow events on the regulating circuit. Each regulator may separately meet the MTBF requirements.

Fluid media for the BARS system 100 may be of a 98% water, 2% glycol-based additive type. Brands that are suitable may include Brand: Stack Magic™, Erifon™, or others. Cleanliness may be NAS 12.

Some embodiments contain filters at appropriate location. The filters may be provided with a bypass check valve to allow flow if the associated filter becomes clogged. With respect to leakage and consumption of fluid, depending on the needs of the user, incoming supply from surface embodiments of the BARS 100 may have 0 drops/minute at 5000 PSI during standby and a maximum of 40% of incoming flow when an intensifier is in use. Outgoing, boosted supply from BARS 100 to subsea accumulators may have 0 drops/minute at 7500 PSI. Incoming supply from subsea accumulators to BARS 100 may have a maximum of 5 drops/minute at 7500 PSI. Outgoing, regulated supply from the BARS 100 to subsea functions may have a maximum of 25 drops/minute at 5000 PSI. A ratio of the boosted supply from BARS 100 to subsea accumulators with respect to the incoming supply from surface may be 1.5, ±3%, and may also vary depending on application. A nominal setpoint of the outgoing supply from BARS 100 to subsea functions may be 5000 PSI and there may be a tolerance on this nominal setpoint of ±5%. It should be understood that these parameters are with respect to specific embodiments, and do not necessary represent every implementation, or possible implementation, according to the present disclosure.

Physical dimensions of the BARS 100 may vary. In one embodiment a BARS is 24×21.5×12.5 inches. Weight may be 4500 pounds. The BARS 100 may be designed to operate over a temperature range of −20 C to +50 C.

In some embodiments, incoming supply from surface may be a 1½" type socket weld SAE Code 62 design with radial seal in addition to compression face seal. Outgoing, boosted supply from BARS to subsea accumulators/incoming supply from subsea accumulators to BARS may be a 1½" type socket weld SAE Code 62 design with radial seal in addition to compression face seal. Outgoing, regulated supply from BARS to subsea functions may be a 1½" type socket weld SAE Code 62 design with radial seal in addition to compression face seal. As with other parameters, these may vary depending upon needs of the end user.

The materials from which the BARS 100 is constructed may vary. However, acceptable stainless steel materials may AISI 316, Nitronic 50, Nitronic 60, 2507 duplex, and/or Inconel 718. 17-4 stainless steel may be used for high strength components if PH1150 heat treated. Internal seals may be suitable for long-term functionality with the relevant hydraulic fluid. In some embodiments, the internal seals may be resilient against occasional exposure to salt water, as well as salt-laden air. In various embodiments all internal seals are suitable for long-term functionality while immersed in salt water, as well as the applicable hydraulic fluid. External seals may also be resilient against occasional exposure to salt-laden air. All materials used on the BARS 100 may be subject to the associated MTBF requirements for the device.

It should be understood that a BARS 100 according to the present disclosure may be constructed, manufactured, maintained, etc. in accordance with a wide variety of standards that may be desirable or required in the art. These include, but are not limited to, various API Specifications or standards (Latest Editions) such as API Spec 16D (Specification for Control Systems for Drilling Well Control Equipment and Control Systems for Diverter Equipment; and API Std 53 (Blowout Prevention Equipment Systems for Drilling Wells). Latest editions of ASTM specifications may also be implemented including, but not limited to: A370 (Standard Test Methods and Definitions for Mechanical Testing of Steel Products); A751 (Test Methods Practice and Terminology for Chemical Analysis of Steel Products); A314 (Nitronic 50 (XM-19), Nitronic 60 (Alloy 218)); E23 (Standard Test Methods for Notched Bar Impact Testing of Metallic Materials); and E709 (Standard Guide for Magnetic Particle Examination). Various ANSI/ASME Specifications (Latest Editions) may also be implemented, including, but not limited to: B21/B21M-06 (Standard Specification for Naval Brass Rod, Bar, and Shapes); and AISI 316 (Stainless Steel).

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
    at least one hydraulic intensifier circuit accepting a supply pressure and returning a boosted pressure that is higher than the supply pressure; and
    at least one regulator that accepts the boosted pressure and returns a regulated lower, regulated pressure that is lower than the boosted pressure;
    wherein the hydraulic intensifier circuit further comprises:
        a reciprocating piston having a first side and an opposed second side, each of the first and second side having with a larger low-pressure region and a smaller high pressure region;
        a first three-way control valve selecting for supply pressure or vent to the first side low pressure region of the reciprocating piston; and a second three-way control valve selecting for supply pressure or vent to the second side low pressure region of the reciprocating piston
wherein a low pressure applied to the first side low pressure region moves the piston to create a high pressure on the second side high pressure region; and
wherein the low pressure applied to the second side low pressure region moves the piston to create the high pressure on the first side high pressure region;
wherein the second control valve pilots the first control valve; and
wherein the piston, when making a first movement toward the second side closes a first two-way valve thereby blocking vent to a pilot port of the second control valve.

2. The system of claim 1, wherein
the first three-way control valve provides supply pressure to the first side low pressure region when not piloted and vent to the first side low pressure region when piloted; and
the second three-way control valve provides supply pressure to the second side low pressure region when not piloted and vent to the second side low pressure region when piloted.

3. The system of claim 1, wherein the piston, when making a second further movement toward the second side opens a second two-way valve thereby providing supply pressure to the pilot port of the second control valve.

4. The system of claim 3, wherein the piston, when making a first movement toward the first side closes a third two-way valve thereby blocking supply pressure from the pilot port of the first control valve.

5. The system of claim 4, wherein the piston, when making a second further movement toward the first side closes a fourth two-way valve thereby providing vent to the pilot port of the second control valve.

6. The system of claim 5, wherein the first and third two-way valves are normally open.

7. The system of claim 6, wherein the second and fourth two-way valves are normally closed.

8. The system of claim 7, wherein the second and fourth two-way valves remain piloted by supply pressure once piloted by contact with the piston.

9. The system of claim 8, wherein additional return bias is provided to the second one-way valve by the first control valve when supply pressure is provided to the first side low pressure region, and additional return bias is provided to the fourth one-way valve by the second control valve when supply pressure is provided to the second low side pressure region.

10. A system comprising:
at least one hydraulic intensifier circuit accepting a supply pressure and returning a boosted pressure that is higher than the supply pressure; and
at least one regulator that accepts the boosted pressure and returns a regulated lower, regulated pressure that is lower than the boosted pressure;
wherein the hydraulic intensifier circuit further comprises:
a reciprocating piston having a first side and an opposed second side, each of the first and second side having with a larger low-pressure region and a smaller high pressure region;
a first three-way control valve selecting for supply pressure or vent to the first side low pressure region of the reciprocating piston; and
a second three-way control valve selecting for supply pressure or vent to the second side low pressure region of the reciprocating piston;
wherein a low pressure applied to the first side low pressure region moves the piston to create a high pressure on the second side high pressure region;
wherein the low pressure applied to the second side low pressure region moves the piston to create the high pressure on the first side high pressure region;
wherein at least the first three-way control valve further comprises:
a casing defining a pilot port, a first operating port, a second operating port, and a third operating port;
a lower spool configured to displace against a first spring bias in response to pressure at the pilot port;
an upper spool defining an upper spool port in fluid communication with the third operating port and a lower spool port in fluid communication with the second operating port, the upper spool slidingly receiving the lower spool and displacing against a second spring bias in response to pressure from the lower spool, and having a hollow interior allowing fluid communication between the upper spool port and lower spool port when not under pressure from the lower spool such that the third and second operating ports are in fluid communication; and
a seat insert slidingly engaged with the lower spool on a lower region thereof, the lower region of the lower spool blocking fluid communication with the first operating port when seated against the seat insert;
wherein the lower spool is configured to engage against the upper spool upon a first displacement of the lower spool blocking the lower port of the upper spool and thereby blocking fluid communication between the third and the second operating ports; and
wherein a second further displacement of the lower spool moves an inletted portion of the lower region into the seat insert allowing fluid communication between the second and first operating ports.

11. The system of claim 10, wherein the lower region of the lower spool further comprises a non-inletted portion that blocks fluid communication through the seat insert to the first operating port during at least a portion of the first displacement.

12. A system comprising:
at least one hydraulic intensifier circuit accepting a supply pressure and returning a boosted pressure that is higher than the supply pressure; and
at least one regulator that accepts the boosted pressure and returns a regulated lower, regulated pressure that is lower than the boosted pressure
wherein the regulator further comprises;
a pilot stage comprising:
a pilot housing;
an upper member in the housing biased toward a middle member in the housing;
the middle member seating against the upper member and providing main pilot port pressure against the upper member and further seating against the pilot housing to selectively block supply pressure from a lower member;
the lower member fixed to the pilot housing and providing a spring biasing the middle member against the upper member;
wherein the upper member displaces the middle member to allow pressure into the lower member and pilot port when the bias of the upper member exceeds the spring bias combined with a pressure in the main pilot port;

wherein the middle member displaces the upper member to seat on the housing and stops supply pressure into the main pilot port when the spring bias and pressure in the main pilot port exceeds the bias of the upper member; and wherein pressure from the main pilot port can separate the upper member from middle member and allow fluid to flow through the lower member, middle member, and upper member to vent via a passage in the pilot housing.

13. The system of claim 12, wherein the regulator further comprises:

a main stage piloted by the main pilot port pressure to displace a valve from an internal valve seat and allow flow from a supply port to a regulated port.

14. The system of claim 13, wherein the regulator further comprises:

a spool interposing the valve and the pilot port to receive pressure from the pilot port and displace the valve from the valve seat against a spring;

wherein the spool is hollow admitting regulated pressure internally and further has an internal spring biased cup selectively venting the regulated port pressure when regulated port exceeds a predetermined limit.

\* \* \* \* \*